July 28, 1942.  J. A. HEANY  2,290,876

PROCESS OF MAKING ABRASIVE GRAINS AND THE PRODUCT THEREOF

Filed Sept. 10, 1938

INVENTOR
JOHN ALLEN HEANY
BY
Braselton Whitcomb & Davis
ATTORNEYS

Patented July 28, 1942

2,290,876

UNITED STATES PATENT OFFICE 2,290,876

PROCESS OF MAKING ABRASIVE GRAINS, AND THE PRODUCT THEREOF

John Allen Heany, New Haven, Conn., assignor to Heany Industrial Ceramic Corporation, Rochester, N. Y., a corporation of New York Application September 10, 1938, Serial No. 229,283

6 Claims. (Cl. 51—309)

This invention relates to abrasives generally, and specifically to a novel form of abrasive grain or grit usable in grinding and abrading operations.

In the prior art it is common practice to form abrasive substances from crystalline grains or particles such as that obtained from silicon carbide or aluminum oxide. The processes involved require the use of high heat to fuse the substance and numerous additional process steps involving considerable care and expense. The crystalline particles so obtained may be applied to numerous uses such as abrasion cloth or paper or abrading wheels, the crystalline particles being maintained in position in these articles by a bond having less hardness than the particles so that the bond yields to present continually a roughened surface of the abrasive to the object to which the abrasive action is applied. Bonds such as the various clays or mixtures of clay, rubber, synthetic resins and the like are employed to hold the abrasive particles together in the article.

In my co-pending application Serial No. 225,376, filed August 17, 1938, I have described a substance made of a homogeneous, vitreous and non-crystalline aluminous material such as bauxite. The material is powdered to a particle size preferably less than twenty microns, and to avoid glazing which would result from masses of this fine powdered material in non-crystalline form, porosity is established throughout the mass by the use of removable volatile substances such as naphthalene uniformly distributed throughout the mass of the material. This substance may be advantageously employed as an abrasive for grinding wheels.

It is an object of the present invention to utilize the abrasive aluminous material described in said co-pending application in particle form. It is a further object of the invention to provide an abrasive wherein the surface of the grains or particles is roughened to afford a more tenacious connection to the bonding material. It is an object of the invention also to provide an abrasive article composed of abrasive grains and a bond of weaker material in which the grains are non-crystalline in structure. It is still another object of the invention to provide improved means for producing an abrasive article having in general the physical attributes of an abrasive formed of bonded crystalline substances. Other objects of the invention relate to the provision of an abrasive, the grains of which are provided with plural sharp cutting edges; to the provision of a non-crystalline abrasive which has non-glazing characteristics; to the provision of an abrasive, the abrading effect of which can be varied readily by a modification of the steps of manufacture; and to the provision of a process which is susceptible of economical treatment and simplified procedure.

Other objects will appear on consideration of the following description and of the accompanying drawing in which is diagrammatically illustrated the product as well as the various steps in the process of manufacture, and in which.

Stated briefly and comprehensively, the invention comprises a novel abrasive formed of grains bonded together, the grains consisting of a non-crystalline, vitreous and porous substance homogeneous in nature.

I employ for my abrasive preferably aluminous material such as alumina or bauxite, bauxite being used in the description as an example of the process and product. The bauxite is powdered to a colloidal fineness preferably less than twenty microns in size, as described in my co-pending application Serial No. 131,126, filed March 16, 1937, and filter pressed, the filter cakes thus formed being dried and then crushed into powder form. This bauxite powder is then mixed in the desired proportions with a volatile solid. The solid employed may be any substance which has a relatively low melting point, which sublimes below its melting point, and which leaves no residue. Gas methods are not applicable since, as will be pointed out hereinafter, the pores produced thereby are lacking in uniformity as to size and distribution. I have found that naphthalene is suitable as a pore forming substance and this material is obtained in the shape of balls of small dimensions. The size of the balls, of course, depends on the degree of porosity required in the abrasive and may vary over a wide range from a ball size passing through a 200 mesh screen to a size of one-eighth inch or larger. No limitation is required as to the shape of the volatile substance, which will be hereinafter referred to as naphthalene as an example, but the spheriodal form is preferable as it insures maximum strength of the porous abrasive substance and lends itself to simple methods of manufacture.

Various means of making the naphthalene balls may be used, but I prefer to follow the shot making method in which melted naphthalene is dropped through an enclosed chamber from a high point, the drops assuming a spheroidal shape and hardening into ball form.

Figure 1:
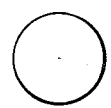
Fig. 1 is a view of a naphthalene ball greatly enlarged.
Figure 2:
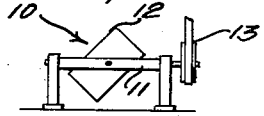
Fig. 2 is a view of the mixing apparatus.
Figure 3:
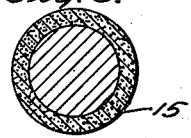
Fig. 3 is a sectional view of a ball coated with powdered abrasive material.
Figure 4:
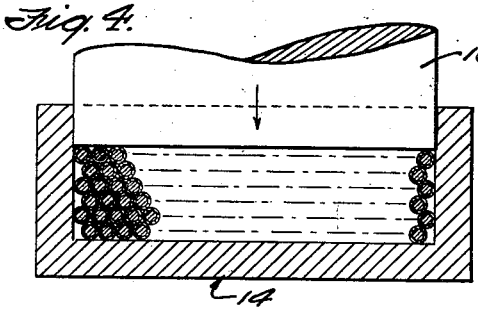
Fig. 4 shows the coated balls in a mold prior to compression.
Figure 5:
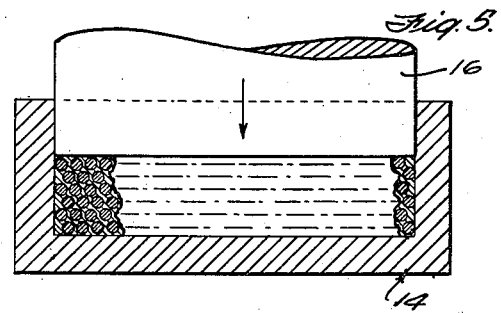
Fig. 5 shows the same mold after compression.
Figure 6:
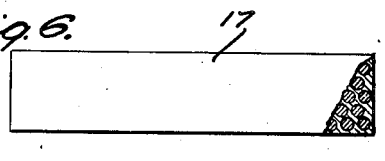
Fig. 6 is a view of the compressed article removed from the mold.

The naphthalene balls, one of which is shown in Fig. 1 of the drawing, and the powdered bauxite hereinabove referred to, are placed in the mixer 10 (shown in Fig. 2) in which is shown diagrammatically a shaft 11 carrying an angularly placed receptacle 12 with means 13 to rotate the same. After a thorough mixing, the time of which may vary according to the requirements, the contents of the mixer are removed and placed in the mold 14 shown in Fig. 4, each of the separate balls being now coated with a uniform layer of bauxite powder 15, as shown in Fig. 3. The plunger 16 (Figs. 4 and 5) is now forced downwardly, compressing the coated naphthalene balls and causing a shifting of the material in such a way as to bring about a closing of the spaces between the balls without materially affecting the spheriodal shape of the balls. The powdered bauxite coating readily shifts under pressure to fill the inter-ball voids. The removed compressed article 17 is shown in Fig. 6.

Figure 7:
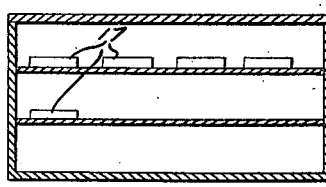
Fig. 7 shows the articles positioned in an oven.

The various articles or cakes 17 are now placed in an oven 18 (Fig. 7) where they are subjected to a heat not exceeding 75° C. for a time period depending upon the dimensions of the article, as for example, two or three days, to bring about a sublimation of the naphthalene. It is important that the temperature does not approach the melting point of naphthalene—80° C.—since any melting of this substance will tend to seal the cavity walls and permit distortion and breakage of the same by the escaping vapors.

Figure 8:
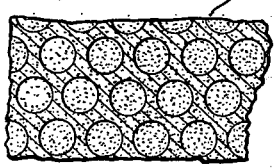
Fig. 8 is an enlarged view of a section of the oven with heated articles showing the uniform cavities.
Figure 9:
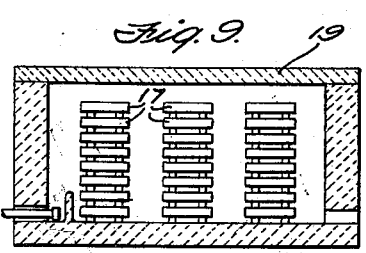
Fig. 9 is a view of the high heat treatment furnace with the abrasive articles stacked therein.

Fig. 8 illustrates the cake as removed from the oven 18, showing the uniform cavities and uniform wall thickness of the material. The cakes are now stacked in the kiln 19 of Fig. 9 and fired to a temperature dependent upon the nature of the abrasive. For bauxite a temperature between 1200° C. and 1450° C. is used, preferably in the neighborhood of 1200° C. For alumina a range of 1200° C. to 1600° C. is permissible, with a preferable temperature around 1500° C. In either case the maximum firing temperature is substantially below the melting point of the abrasive. The firing operation extends over a time period depending upon the size of the cake and the material, and varying from nine hours in the case of a small furnace and bauxite, to one or two weeks for larger articles and furnaces.

During the firing operation there is a considerable shrinkage of the cake—as high as 30% in the case of bauxite and 23% in the case of alumina, but because of the porous structure there is no distortion of the shape of the article.

Figure 10:
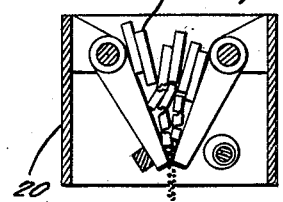
Fig. 10 shows a jaw crusher operating on the articles.
Figure 11:
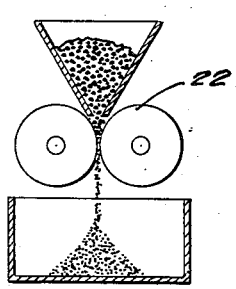
Fig. 11 shows roll grinders operating on the crushed material.
Figure 12:
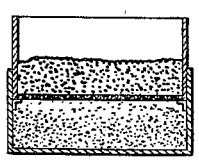
Fig. 12 illustrates screening mechanism.
Figure 13:
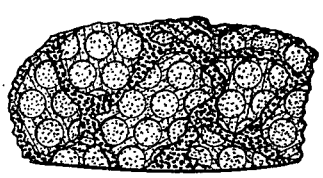
Fig. 13 is a view of a molded abrasive formed from the grains or particles.

The abrasive cakes made as described above are now treated to break up the article to form small size grains suitable for use in abrasive articles such as a grinding wheel. Fig. 10 illustrates a jaw crusher 20 operating on the completed cakes 21, producing rough grains which are further broken up by the rollers 22, as shown in Fig. 11. This finely ground abrasive material is then screened as indicated in Fig. 12 and graded according to the dimensions of the grains. These grains are now bonded together in an abrasive article such as a wheel, or on the surface of cloth or paper. The bond used is of the usual types such as rubber, shellac, sodium silicate, synthetic resins and various clays, and ordinarily should be weaker and softer than the abrasive grains so that in operation the abasive surfaces project, forming a hard, roughened surface, the softer bond receding and breaking away as the surface grinds down. The grains, being non-crystalline, do not chip as in the case of the usual crystalline abrasive surface, but wear gradually by the yielding of the thin walls projecting radially from the surface of the abrasive. The action of these edges is similar to a metal cutter provided with multiple teeth. The cavities or pores offer spaces in which the ground material may enter and later be thrown out by movement of the grinder. A porosity which provides approximately 85% pore space is found to be desirable in these grains by giving a wall width of adequate compression strength and yet not sufficient to bring about a closing effect for the surface. This size wall also is sufficiently thin to wear down with the grinding surface.

It is thus apparent that a grinding material is produced by the above described process which is broadly parallel in its general construction to a crystalline abrasive but specifically differs in the nature of the abrasive grain, in applicant's abrasive the grain being non-crystalline and vitreous, of high density and possessing a hardness of over 9 Mohs, and nevertheless, because of its porous structure, being free of glaze during the grinding operation.

It is particularly pointed out that the process results in a grain in which the pore walls have approximately uniform thickness and the pores uniform diameter. This is due to the fact that in mixing the naphthalene balls with the finely divided bauxite or other aluminous material the powder coats uniformly on the balls so that in the compressed cake of Fig. 6 there is a uniformity of placement of the naphthalene balls. This uniformity is preserved throughout the process to the final product. Thus I am able, by varying the size of the naphthalene balls or by varying the thickness of the abrasive coating of the balls, or by both of these methods, to secure an abrasive structure of any desired fineness.

An important distinction over the prior art embodied in the crystalline grain abrasive consists in the fact that whereas the crystalline surface tends to be more or less regular, the surfaces of the grains of my abrasive are exceedingly rough due to the pits formed by the various pores. Consequently a body of conglomerations as in a wheel structure are strong and tenacious due to the flowing of the bond into the pits and irregular cavities formed on the grain surface.

Although the preferred material produced according to the present invention is amorphous with a conchoidal fracture, it is also possible in certain instances to produce a material containing some crystals or which is in part crystalline. However, it is always desirable to produce such material by firing below the fusion point of the alumina so that any crystalline structure which results will not be obtained from solidification or re-crystallization of a fused mass.

Modifications other than those hereinabove mentioned may be made provided the same come within the scope of the claims hereto appended.

I claim as my invention:

1. The process of forming an abrasive article which comprises the steps of coating naphthalene balls with bauxite powdered to a size of less than 20 microns, molding a plurality of these coated balls to form a cake, heat treating the cake at a temperature not exceeding 75° C. to sublime the naphthalene and produce uniformly spaced cavities throughout the cake mass, firing the cakes at a temperature below 1500° C., crushing the cakes to form grains with roughened pitted surfaces, and bonding the grains.

2. The process of forming abrasive grains from aluminous materials, which comprises grinding an aluminous material to a state of colloidal fineness in the presence of water, filter pressing to remove the excess water, drying the filter cakes, crushing the dried filter cakes into powdered form, mixing the powdered aluminous material with small balls of naphthalene having a size ranging from about 200 mesh to about ⅛ of an inch to cause said naphthalene balls to be coated with the powdered aluminous material, compressing the coated balls to form a compact mass in which the naphthalene balls are separated by a continuous compacted phase of powdered aluminous material, volatilizing the naphthalene by subjecting the compressed mass to a heat not exceeding 75° C. for about two to three days, firing the resultant cakes to a temperature of between about 1200 to 1600° C. and breaking up the fired cakes to form small abrasive grains.

3. Abrasive grains of an amorphous, vitrified, non-crystalline, unfused, fired, colloidally ground dehydrated alumina, said grains having uniformly dispersed therethrough a plurality of spherical voids, said voids occupying between 80% to 90% of the total volume of the grains.

4. Abrasive grains of an amorphous, vitrified, non-crystalline, unfused, fired, colloidally ground dehydrated bauxite, said grains having uniformly dispersed therethrough a plurality of spherical voids, said voids occupying between 80% to 90% of the total volume of the grains.

5. Abrasive grains of an amorphous, vitrified, non-crystalline, unfused, fired, colloidally ground, dehydrated, aluminous material, the particles of which before firing have a size of substantially less than 20 microns, said grains after firing having uniformly dispersed therethrough a plurality of voids occupying a large portion of the total volume of the grains.

6. A process of forming abrasive grains from aluminous materials selected from the group consisting of bauxite and precipitated alumina, which comprises grinding such aluminous material in water to a very fine state, removing the water from the ground material and drying the ground material until it is powdered, mixing the powdered material with particles of a volatilizable organic material, compressing the mixture to a compact mass and then heating at successively higher temperatures first to volatilize the volatilizable material and then to vitrify the residual material to form a vitrified structure having dispersed throughout the body thereof a plurality of voids, and finally breaking up the material to form abrasive grains.

JOHN ALLEN HEANY.